(12) United States Patent
Griffin

(10) Patent No.: US 8,440,146 B2
(45) Date of Patent: May 14, 2013

(54) GAS PRODUCTION THROUGH PULSED ELECTROLYSIS

(75) Inventor: Linnard Gene Griffin, Bertram, TX (US)

(73) Assignee: G & M Energy Systems, LLC, Carrollton, TX (US)

( * ) Notice: Subject to any disclaimer, the term of this patent is extended or adjusted under 35 U.S.C. 154(b) by 1014 days.

(21) Appl. No.: 12/329,703

(22) Filed: Dec. 8, 2008

(65) Prior Publication Data

US 2009/0152126 A1    Jun. 18, 2009

Related U.S. Application Data

(60) Provisional application No. 61/005,961, filed on Dec. 10, 2007, provisional application No. 61/107,197, filed on Oct. 21, 2008.

(51) Int. Cl.
*C25B 1/04* (2006.01)

(52) U.S. Cl.
USPC ........... 422/500; 205/630; 205/635; 205/638; 204/228.1

(58) Field of Classification Search .................. 205/628, 205/630–633, 635–639; 204/228.1
See application file for complete search history.

(56) References Cited

U.S. PATENT DOCUMENTS

| | | | | |
|---|---|---|---|---|
| 5,252,192 A | * | 10/1993 | Ludwig | 205/794 |
| 2006/0180464 A1 | * | 8/2006 | Griffin | 204/280 |

* cited by examiner

*Primary Examiner* — In Suk Bullock
*Assistant Examiner* — Paul Hyun
(74) *Attorney, Agent, or Firm* — Gardere Wynne Sewell LLP

(57) ABSTRACT

Cells and methods of producing hydrogen and oxygen from an aqueous solution at about 90% of the Faraday Limit are provided. An exemplary method includes the steps of placing a graphite electrode and a nickel electrode in an alkaline solution comprising colloidal silver, colloidal magnesium and a powdered metal such as aluminum, and applying a constant positive voltage to the nickel electrode. Further, the example includes cyclically applying a negative voltage potential to the graphite electrode by turning on the negative applied voltage for a first time period and switching off the negative voltage for a second time period. The second time period should be sufficient to permit removal of substantially all or at least some of any aluminum or zinc deposited on the graphite electrode. Graphite-containing electrodes may be pretreated to infuse with a precious metal.

11 Claims, 8 Drawing Sheets

|   | Volts | Amps | Time/sec | Measure/cc | Joules | J/cc | 100% Eff | %Eff | Kwh/kg | $Kg | Rc |
|---|---|---|---|---|---|---|---|---|---|---|---|
|   | b | c | d | e | f | g | h | i | j | k | l |
| 1 | 2 | 0.25 | 1800 | 87.56 | 900 | 10.279 | 56.663 | 102.915 | 32.078 | $2.57 | 8 |
| 2 | 2 | 0.25 | 1800 | 90.3 | 900 | 9.967 | 56.663 | 106.136 | 31.105 | $2.49 | 8 |
| 3 | 2 | 0.25 | 1800 | 84.6 | 900 | 10.638 | 56.663 | 99.436 | 33.200 | $2.66 | 8 |
| 4 | 1.8 | 0.25 | 1800 | 75.1 | 810 | 10.786 | 56.997 | 98.078 | 33.660 | $2.69 | 7.2 | b    Applied DC Volts
c    Applied Amps
d    Time seconds
e    $H_2O$ gas measured STP
f    Joules b x c x 1800
g    f/g
h    f/10.5783 x 0.666
i    e/h x 100 x 0.666
j    g/3600000 x 1000 x 11235
k    j x 0.08

*FIG. 8*

GAS PRODUCTION THROUGH PULSED ELECTROLYSIS

STATEMENT OF RELATED APPLICATIONS

This application claims priority from U.S. provisional patent application No. 61/107,197 filed Oct. 21, 2008, and from U.S. provisional patent application No. 61/005,961 filed on Dec. 10, 2007.

BACKGROUND

1. Technical Field

The present technology relates to the field of electrolysis, and more particularly to the use of electrolysis techniques to produce hydrogen and oxygen gasses.

2. Description of the Related Art

In the field of electrolysis it is generally regarded as highly desirable to be able to produce hydrogen (and oxygen) at or near the Faraday Limit of 10.5873 Joules per ml, which is the power presumed necessary to be 100% efficient. While many systems have been proposed to meet this goal, it appears that electrolysis may often require exotic chemicals and complex electrical switching systems to exceed even a modest 70% of the Faraday Limit. Exceeding this limit of 10.5873 J/ml generally requires replenishing or replacing some consumables, for example, replacing electrodes due to dissolution and/or the replenishing of consumed chemical(s).

SUMMARY

An exemplary embodiment of an electrolysis cell and process produces hydrogen and oxygen gasses, by electrolysis of water, at efficiencies ranging above about 80% of the Faraday Limit and approaching and often exceeding about 90% of the Faraday Limit. An embodiment of the technology employs a minimum of two electrodes per cell to provide a system that requires little maintenance, such as electrode repair or maintenance of chemicals, other than addition of make up water to compensate for water consumed in the process. Another exemplary embodiment provides an electrolysis system that may use DC power rather than complex alternating current waveforms and fixed non-replaceable elements.

An exemplary embodiment provides a method of producing hydrogen and oxygen from an aqueous solution. The method includes the steps of placing a graphite electrode and a nickel electrode in an alkaline electrolyte comprising colloidal silver, colloidal magnesium and aluminum powder, and applying a constant positive voltage to the nickel electrode. Further, the method includes cyclically applying a negative voltage potential to the graphite electrode by turning on the negative applied voltage for a first time period and switching off the negative voltage for a second time period. The second time period should be sufficient to permit removal of substantially all or at least some of any aluminum deposited on the graphite electrode.

An exemplary embodiment provides a cell producing hydrogen and oxygen gas from an aqueous solution. The cell includes an alkaline electrolyte having colloidal silver, colloidal magnesium, and a metal powder comprising aluminum powder. It also has at least one positive electrode disposed at least partially in the alkaline solution and at least one switching negative electrode that includes graphite, infused with a precious metal. The switching negative electrode is also disposed at least partially in the electrolyte. In addition, the cell has a first chamber configured and located to capture gas produced at the positive electrode; and a second chamber configured and located to capture gas produced at the at least one switching negative electrode. Further, it includes an automatic controller cyclically applying negative voltage potential to the switching negative electrode according to a predetermined sequence. In an alternate embodiment, the aluminum powder may be substituted with finely divided zinc hydroxide. In this instance, the positive electrode comprises nickel and is pre-treated with zinc, as explained here below An additional exemplary embodiment provides a cell producing hydrogen and oxygen gas from an aqueous electrolyte. The cell includes an alkaline electrolyte comprising colloidal silver, colloidal magnesium, and a metal powder comprising aluminum. The cell has at least one positive electrode disposed at least partially in the alkaline electrolyte; and a plurality of switching negative electrodes. The switching electrodes each comprise graphite, infused with a precious metal, and the plurality of switching negative electrodes is disposed at least partially in the alkaline electrolyte. The cell has a first chamber configured and located to capture gas produced at the positive electrode; and a second chamber configured and located to capture gas produced at the plurality of switching negative electrodes. The cell also includes an automatic controller cyclically applying negative voltage potential to each of the plurality of switching negative electrodes for a predetermined time and according to a predetermined sequence. In an alternate embodiment, the aluminum powder may be substituted with finely divided zinc hydroxide. In this instance, the positive electrode comprises nickel and is pre-treated with zinc, as explained here below

BRIEF DESCRIPTION OF THE DRAWINGS

For a more complete understanding of the present technology, and the advantages thereof, reference is now made to the following description taken in conjunction with the accompanying schematic, not-to-scale drawings in which:

FIG. 8 illustrates TABLE 1;

DESCRIPTION

Figure 1:
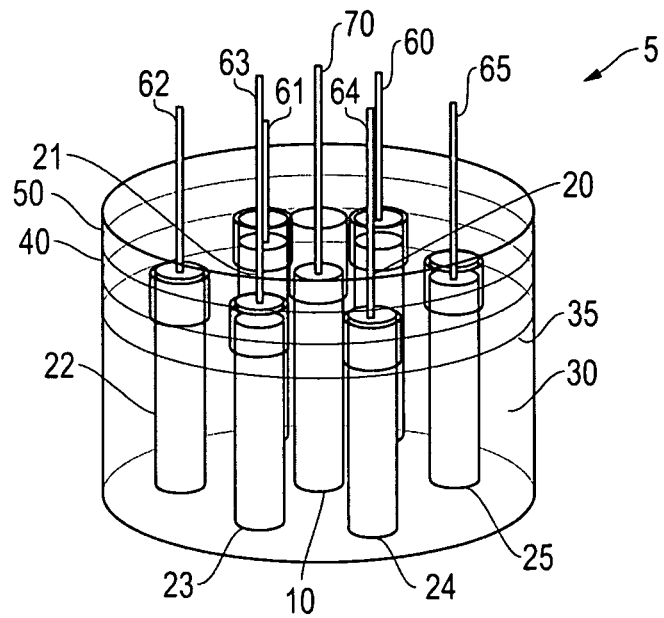
FIG. 1 illustrates an exemplary embodiment that has 1+n switched electrodes; where n=6.

In the following description, numerous details may be set forth to provide a thorough understanding of the present technology. However, it will be apparent to those skilled in the art that the present technology may be practiced without these specific details. In other instances, well-known circuits have been shown in block diagram form in order not to obscure the present technology in unnecessary detail. For the most part, details considering alternate material choices and design configurations and the like have been omitted inasmuch as details are not necessary to obtain complete understanding of the present technology and are within the skills of persons of ordinary skill in the relevant art.

In the appended drawings, depicted features are not necessarily shown to scale. Further, like or similar features are designated by the same reference numeral through the several views, as far as possible.

Figure 2:
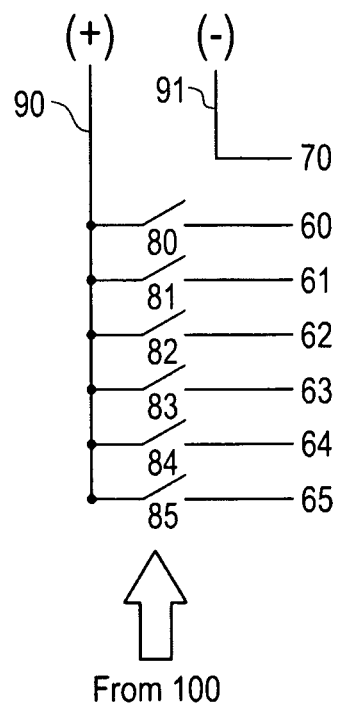
FIG. 2 illustrates a schematic of an embodiment of a switching relay.
Figure 3:
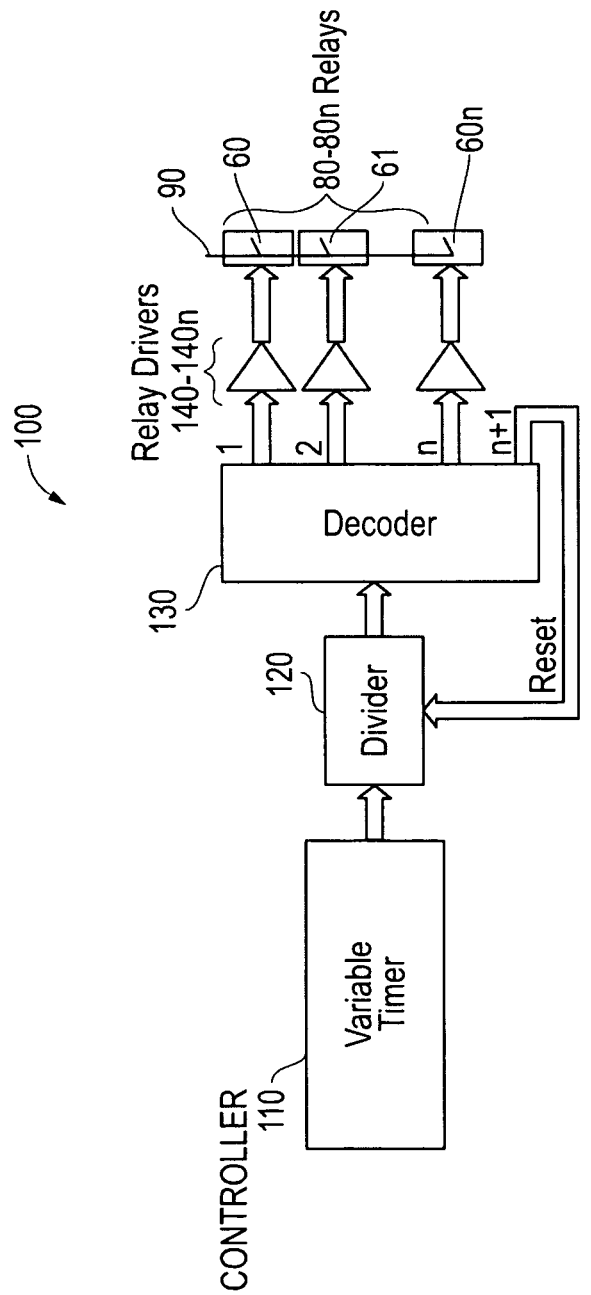
FIG. 3 is a block diagram illustrating features of an exemplary embodiment of a controller.

FIG. 1 illustrates an exemplary embodiment of an electrolysis cell 5 that includes a chemical bath 30, which is cylindrical in this case, but which may be of another geometric configuration, such as square, hexagonal, etc., in cross section. The chemical bath 30 has a central electrode 10 to which is applied a fixed voltage. The central electrode is surrounded by six switched voltage electrodes 20, 21, 22, 23, 24, 25 in this embodiment, although another number of electrodes may also be used. Each of these electrodes 20-25 are subjected to a pulsed or cyclical applied negative voltage. Thus, each switched electrode 20-25 may be "on" (voltage applied) or "off" (voltage not applied). Thus, for example, each of switched electrodes 20-25 has a connector 60, 61, 62, 63, 64, 65, respectively. As shown schematically in FIG. 2, a switch relay 90 includes a series of switches 80-85. Each of the switches 80-85 is able to close a circuit with a corresponding one of the connectors 60-65. When a switch is closed, a voltage is applied via the closed switch through the connector to the electrode. A constant voltage is applied via line 91 through connector 70 to the central electrode 10. Thus, the switched electrodes 20-25 may be switched on in any predetermined sequence such that one of the electrodes 20-25 is on while the others are off. FIG. 3 illustrates an example of a controller system 100 that may be used to achieve the switching automatically. Of course, other types of controllers are also useful as long as they can "pulse" the switched electrodes 20-25 on and off and maintain a constant voltage at the central electrode 10. Further, the chemical bath 30 has separate gas chambers 40, 50 that are isolated from each other. The gas chamber 50 surrounding an upper portion of central electrode 10 is an oxygen chamber, while the gas chamber surrounding upper portions of the switched electrodes 20-25 is a hydrogen chamber. These chambers are used to capture off-gasses from the electrolysis process produced at the electrodes, and the off gasses may be siphoned off from these chambers by conduits (not shown) for any useful purpose. More than two chambers may also be useful, depending upon the configuration of the chemical bath 30, the number of fixed electrodes 10 per chemical bath 30, the number of switched electrodes 20-25, and other factors. Chemical bath 30 contains an electrolysis solution 35, indicated by its upper surface level in FIG. 1.

A "switching cycle" is the time period between when a switching electrode is first turned on (or off) and when it is next turned on (or off). The switching electrodes are "pulsed" by a pulsing period that is the time period from being turned on to being turned off. Referring to FIG. 3, exemplary controller 100 includes a variable timer 110 for setting the switching cycle time. The variable timer 110 is coupled to a decoder 130 through a divider 120. The decoder 130 sends signals to relay drivers 140-145 (shown generically as 140-140$n$ in FIG. 3, for example) that are each in communication with a corresponding relay switch 80-85. The relay switches 80-85 are each coupled to a corresponding connector 60-65. As explained above, these connectors 60-65 are each in turn connected to a corresponding switched electrode 20-25.

Figure 5:
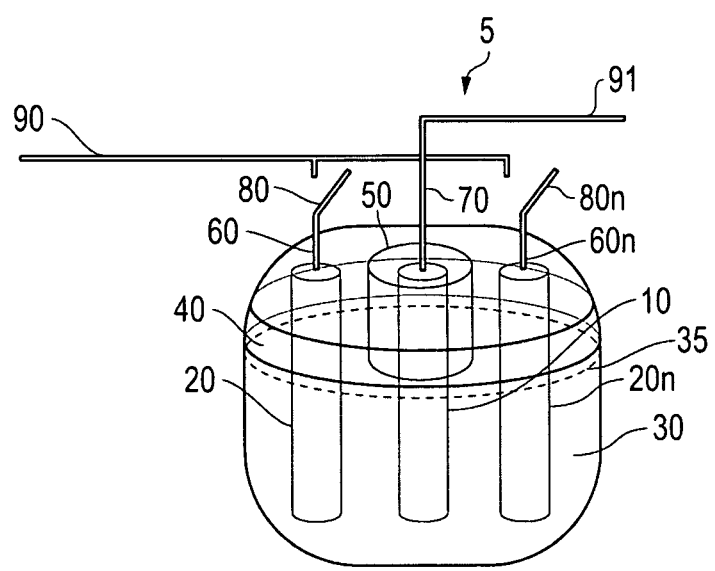
FIG. 5 illustrates an exemplary generalized embodiment of an electrolysis cell.

FIG. 5 is a schematic illustration of an exemplary and generalized embodiment of an electrolysis system 5 that has a single fixed voltage electrode 10 and n switched voltage electrode(s) 20, 20$n$. The illustrated embodiment shows a case where "n" equals 2, but of course n may be any integer. The positive electrode 10 is located at or near the center of the chemical bath 30 surrounded by a circular array of n electrodes 20, 20$n$. These n electrodes 20, 20$n$ may be in either a negatively charged state or off, as described above.

In an exemplary embodiment, the positively charged electrode 10 may be a nickel electrode. Another electrolytically equivalent electrode, such as nickel alloy, Incalloy™, tungsten, tungsten carbide, and the like, may also be useful. An exemplary embodiment of switched electrode element 20 is a proprietary carbon-based electrode that is available from Global Hydrogen, Inc. of Bertram, Tex. The chemical bath 30 utilized with this electrode combination may suitably include finely divided aluminum.

In another exemplary embodiment, the switched negative electrodes 20, 20$n$ may include nickel, or nano nickel, or nano nickel and iron, or tungsten, or tungsten carbide. The positively charged electrode 10 may be graphite. In this embodiment, the chemical bath may contain finely divided zinc hydroxide, instead of aluminum.

According to the example of FIG. 5, a fixed positive voltage is connected to connection line 91 and a negative voltage is connected to connection line 90. The fixed electrode 10 is connected directly to the positive voltage connection line 91. The electrode elements 20, 20$n$ each include a connector 60-60$n$, respectively, and these connectors 60-60$n$ may each be sequentially coupled to the negative voltage connection line 90 through a corresponding relay switch 80-80$n$.

The example of a chemical bath 30 shown in FIG. 5 includes two isolated gas chambers 40 and 50 to separate $H_2O$ (liquid), hydrogen (gas) and oxygen (gas). Details of the electrolysis solution 35 in the chemical bath 30 are described below.

As used herein, the term "out-gasses" refers to gasses produced in the processes of embodiments including production through electrolysis and production through the reaction of metals with components of the electrolysis liquid.

The exemplary embodiment of the system 5 shown in FIG. 5 is in a quiescent state with all negative electrodes 20, 20$n$ off. External power may be supplied to electrodes 20-20$n$ through corresponding relay switches 80-80$n$ from connection line 90, and to electrode 10 via line 91. Electrode elements 20, 20$n$ are always either (a) at negative voltage potential when switched on or (b) disconnected (or "off"). Electrode element 10 is always positive. However, reverse voltage may be applied with different results. In the quiescent state, all relays 80, 80$n$ are in the normally open state and no gasses are emitted from either electrode 10 or 20, 20$n$. Relays 80, 80$n$ are operated sequentially (i.e. for the configuration in FIG. 5, connecting line 90 may rotate).

Figure 6:
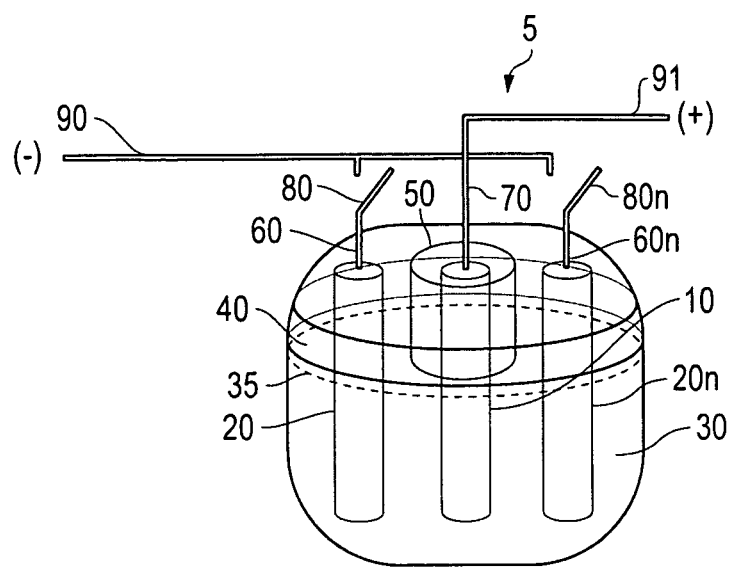
FIGS. 6-7 illustrate exemplary embodiments of electrolysis cells with differing polarities on the electrodes.

Referring to FIG. 6, when relay 80 closes, it applies a (−) negative voltage to electrode 20 and electricity flows between electrode 20 and positive electrode 10 through the electrolytic solution of chemical bath 30. Electrolysis takes place in the chemical bath 30, so that oxygen out-gasses at electrode 10 while hydrogen out-gasses at electrode 20. This gas production continues for a time period that extends beyond the time when the controller 100 relay switch 80 opens (disconnects from electrode 20) and closes relay 81 (not shown). The controlled process of timed opening and closing of relays according to a predetermined schedule is repeated sequentially for each electrode from 20 through 20$n$, and then the cycle repeats starting at electrode 20.

During the process, electrode 10 continues producing $O_2$ (gas) as long as the controller is sequencing and any of electrodes 20 through 20$n$ produces $H_2$ (gas) as long as it is live and for a period immediately after applied voltage is removed and it is dead. According to an exemplary embodiment, immediately after any electrode 20$n$ is deselected by the controller and is dead, it will continue to produce $H_2$ (gas) for a period of time, despite being disconnected. After a predetermined period of time, the controller 100 via the relay switching mechanism, for example as described above, switches the applied voltage from one electrode (e.g. electrode 20 (n−1)) to the next electrode (e.g. electrode 20n). The process repeats and continues to cycle until it is stopped, when the system returns to the quiescent state. Note that hydrogen is emitted from the (−) electrode and oxygen is emitted from the (+) electrode.

Figure 7:
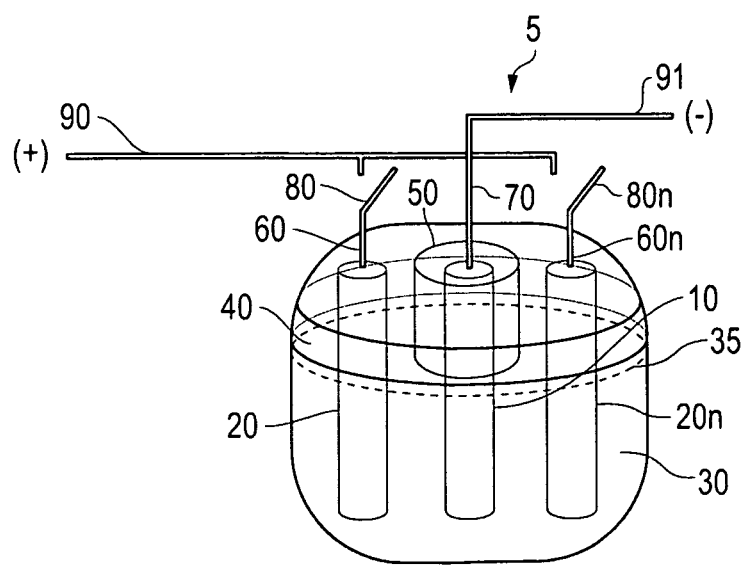

Referring to exemplary FIG. 7, the polarity of the electrodes is reversed relative to that of FIG. 6. For example, in FIG. 7, the central electrode 10 is negatively charged while the switched electrodes 20-20n are positively charged, when activated.

Electrode Preparation

According to an exemplary embodiment, the system uses two types of electrodes: a metal electrode, desirably nickel or an alloy of nickel, and graphite. These electrodes are treated before being used. It is theorized, without being bound, that the treatment saturates the pores of the electrodes with colloidal material and that it also increases the effective surface area of the electrodes by etching their surfaces.

In an exemplary embodiment, a solution that includes colloidal platinum, available from Purest Colloids, Inc. of Westhampton, N.J., USA, may be used in pre-treating the electrodes. The treatment solution may be prepared by adding about 75 ml of colloidal platinum to 75 ml distilled water and 10 ml of 98% sulfuric acid. Of course, for larger batches, these volumes may be increased proportionately. The colloidal metal is not restricted to platinum but may be any colloidal precious metal such as gold, palladium, rhenium, ruthenium, and the like. The electrodes are immersed at least partially in the solution and a positive terminal of a power source may be connected to the nickel electrode and a negative to the graphite electrode. Upon current flow, the graphite electrode becomes impregnated with platinum. This may be carried out, for example, at 4 volts dc and a 5 amp current. Then, after elapse of a time period, typically but not necessarily in the range 10-15 seconds, polarity is reversed, applying the same current and voltage potential, to plate platinum onto the nickel electrode's surfaces. This reversing of polarity may be carried out several times, desirably while heating the electrolysis solution to about 108° F. The process may be carried out for about 10 minutes, and then the electrodes may be removed and washed in distilled water.

An alternative embodiment of a method of electrode treatment includes using a palladium or platinum anode and a graphite or metal cathode to create a metal colloid and carrying out the infusing and plating in one step.

Cell Operation

As explained above with reference to FIG. 6, electrode element 10 has a positive voltage at all times and electrode elements 20, 20n are always either negative when connected, or otherwise disconnected. In the quiescent state, electrode elements 20, 20n are disconnected by relays 80, 80n, respectively, and no gas is emitted from electrode elements 10 or 20, 20n. In the active state, the controller 100 closes and opens relays 80, 80n in a predetermined scheduled sequence around the illustrated circular cell until the process is terminated. When the controller 100 closes relay element 80, a negative voltage is applied to electrode 20, for example, while electrode 10 is always positive. While relay 80 is closed, copious amounts of hydrogen are emitted from electrode element 20 and oxygen is emitted from electrode element 10. Due to electrolysis reactions, metal hydroxide present in the chemical bath solution plates out onto electrode 20 as a metallic coating while the electrolysis generates hydrogen and oxygen.

In an exemplary embodiment, the voltage controller 100 is preset or pre-programmed for a "relay closed" time period of three seconds for each electrode 20, 20n. Thus, it automatically closes a relay for each negative electrode sequentially for three seconds. As a consequence, the metal is plated onto the electrode for which the relay is closed (i.e. the "live" negative electrode) for three seconds. When the controller opens the relay, components of the chemical bath 30 solution commence reducing the plated out metal on the now dead electrode, thereby releasing copious hydrogen due to the reduction of metal to metal hydroxide, until substantially all the metal is dissolved back into element 30, or until a negative voltage potential is again applied to the electrode, when metal plating will recommence. In general, after the negative potential is disconnected from the electrode, the disconnected electrode 20 will continue producing gas at a gradually reducing rate and will substantially return to the quiescent state in about seven seconds. In the illustrated example embodiment shown in FIG. 1, there are six electrodes 20 which the controller 100 may sequentially connect to the negative connection lines 90 for three seconds each. Thus, the initial negative electrode 20 produces gas for a minimum of about ten seconds (three seconds while connected and seven seconds after disconnection). The electrode 20 will be selected for re-connection to line 90, according to the controller sequence, fifteen seconds after it was disconnected. The controller 100 establishes a three-seconds "on" and fifteen-seconds "off" sequence for each electrode 20, 20n. The production rate of this system averages over about 90% of the hydrogen that stoichiometry would predict (see FIG. 8, Table 1).

The gas-producing electrochemical process (metal plating onto the electrode when it is live and metal converting back to metal hydroxide when the electrode is dead) is believed, without being bound, to be of a catalytic nature and should continue as long as $H_2O$ lost through conversion to hydrogen and oxygen is replenished. It is believed, without being bound, that the colloidal silver and colloidal magnesium along with palladium infused in the graphite electrode have a catalytic effect.

When the controller 100 activates an electrode with an applied negative potential, for example electrode 20, electrical current will flow through the electrolyte chemical bath solution 30 between positive electrode 10 and negative electrode 20. Metal is plated on electrode 20, and if the process is allowed to continue, electrode 20 would become increasingly heavily plated, thus changing its electrical potential. As a result, its rate of hydrogen gas production would decline and finally cease. However, according to embodiments of the present technology, electrode 20 is disconnected (the applied potential is removed) after a predetermined period of time. In the non-limiting example described above, this time period was three seconds, although other longer or shorter time periods may be useful as well. In general, the time period may be selected based on several factors, one of which is to permit sufficient "electrode off" time to permit the chemical bath components to oxidize substantially all or so much of the metal from the electrode surface so that the amount of plated metal does not build up to the point of adversely affecting the rate of hydrogen gas production during the time period that the electrode is on. Thus, the chemicals in the electrolyte 35 may begin reacting with the metal deposited on electrode 20, thereby releasing more gas, and may substantially completely remove the deposited metal by the time electrode 20 is again selected by the controller 100 for activation. The total amount of gasses produced includes both (a) gas produced while an electrode is live and (b) gas produced when the electrode is dead. Accordingly, the electrical energy input needed to produce the total amount of gasses is less than would be the case if the gas produced under condition (b) also required energy (electricity) input.

The cycle time of the controller 100 may be set or pre-programmed to take into account various factors, including, but not limited to, power supplied to the electrodes, the voltage, the current, the electrode active surface area, the number of cells (a cell includes a negative electrode, the positive electrode and the chemical bath solution), and the cell configuration.

The Controller

Figure 4:
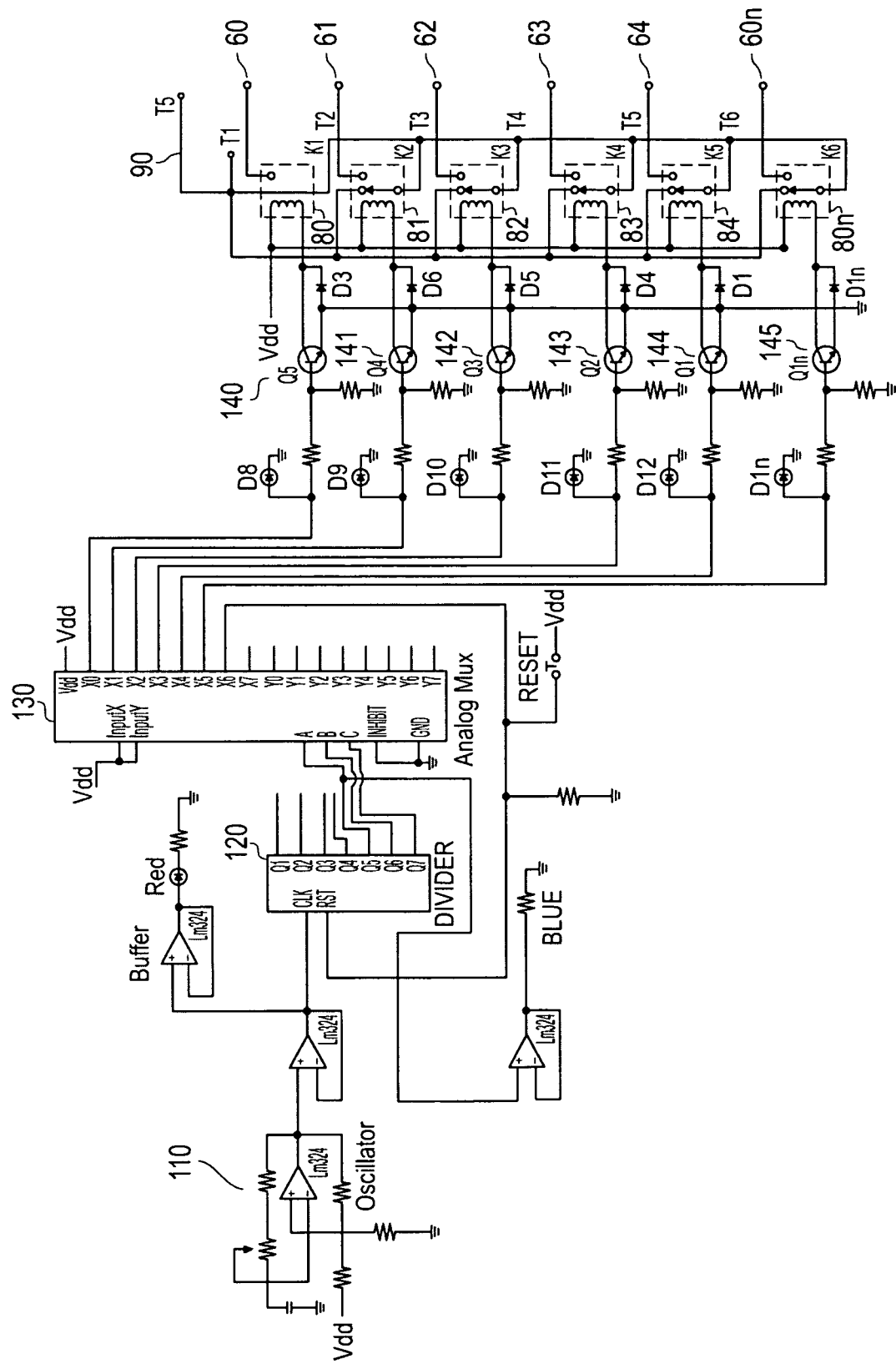
FIG. 4 is a schematic of an exemplary embodiment of a controller showing additional detail.

It is understood that the illustrated exemplary embodiment of controller 100 in FIGS. 3 and 4 is merely one of many potentially useful controllers provided for explanatory purposes. Other forms of electronic controllers, such as Asics, or software controlled devices or micro-processors may be substituted, for example.

A more detailed drawing of an embodiment of an exemplary controller 100 is shown in FIG. 4. For purposes of description, element 110 may be a variable LM324 Op Amp oscillator generating square waves controlled by the RC time constant of R1, R16 and C11. Element 110 may, for example, be adjusted for a three-minute output of Divider Q5. Divider 120 may be a seven stage CMOS Divider. Since the exemplary circuit has six switched elements 20-20n, a four bit divider would suffice. The unused stages Q1-Q4 buffer the clock for more accurate timing, if required. The outputs Q5-Q7 are input to an analog sixteen bit decoder 130. A digital decoder may also be used. The decoder drives a Bipolar NPN transistor(s) MOSFET substitutable and has an LED to indicate which element is selected. Output X6 130 returns the counter to reset, causing the divider 120 to reset starting the count over after every sixth count. The number of counts are thus=n, up to n=8 for this example of a chip, or n=16 by using additional logic or a 4:16 bit decoder. The base input of the transistors 140-140n are normally disconnected and grounded turning the transistor(s) "OFF." When the counter 120 selects the channel on Output X6 130, a positive voltage is applied to the selected transistor turning the selected coil on. Coils 80-80n apply voltage on line 90 to the appropriate electrode. A diode is used to suppress high voltage induced by switching of the coils.

The controller system 100 shown in FIGS. 3 and 4 operates the relays 80, 80n at precise predetermined times. A first LED (D2), which may be any color, such as red, pulses at the Adjusted Oscillator frequency and a second LED (D7), which may be any color (conveniently a different color from the first LED), pulses at the electrode timing frequency, which, in this example, is three seconds "live." Of course, timing can be set by monitoring the state changes of the LEDs (D8-D13).

Figure 9:
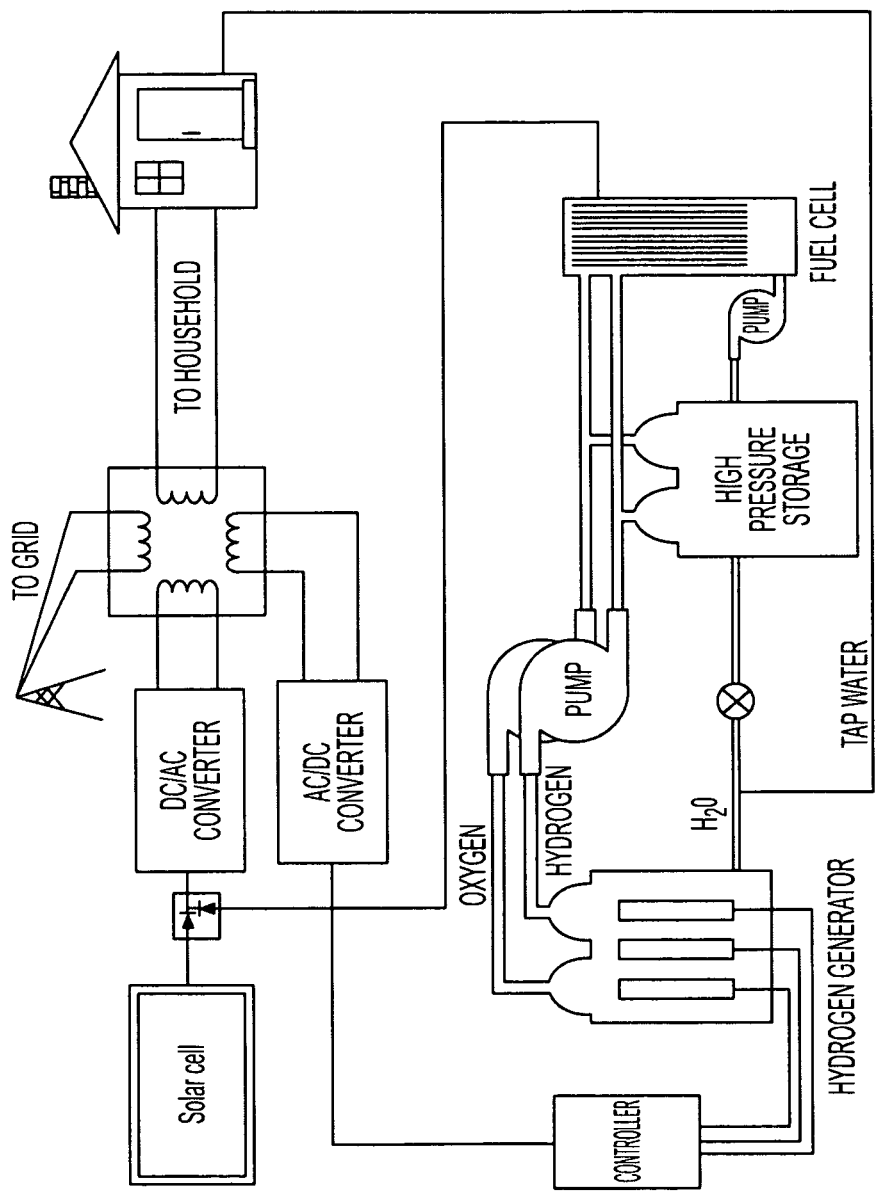
FIG. 9 is an exemplary embodiment of a solar home power application.
Figure 10:
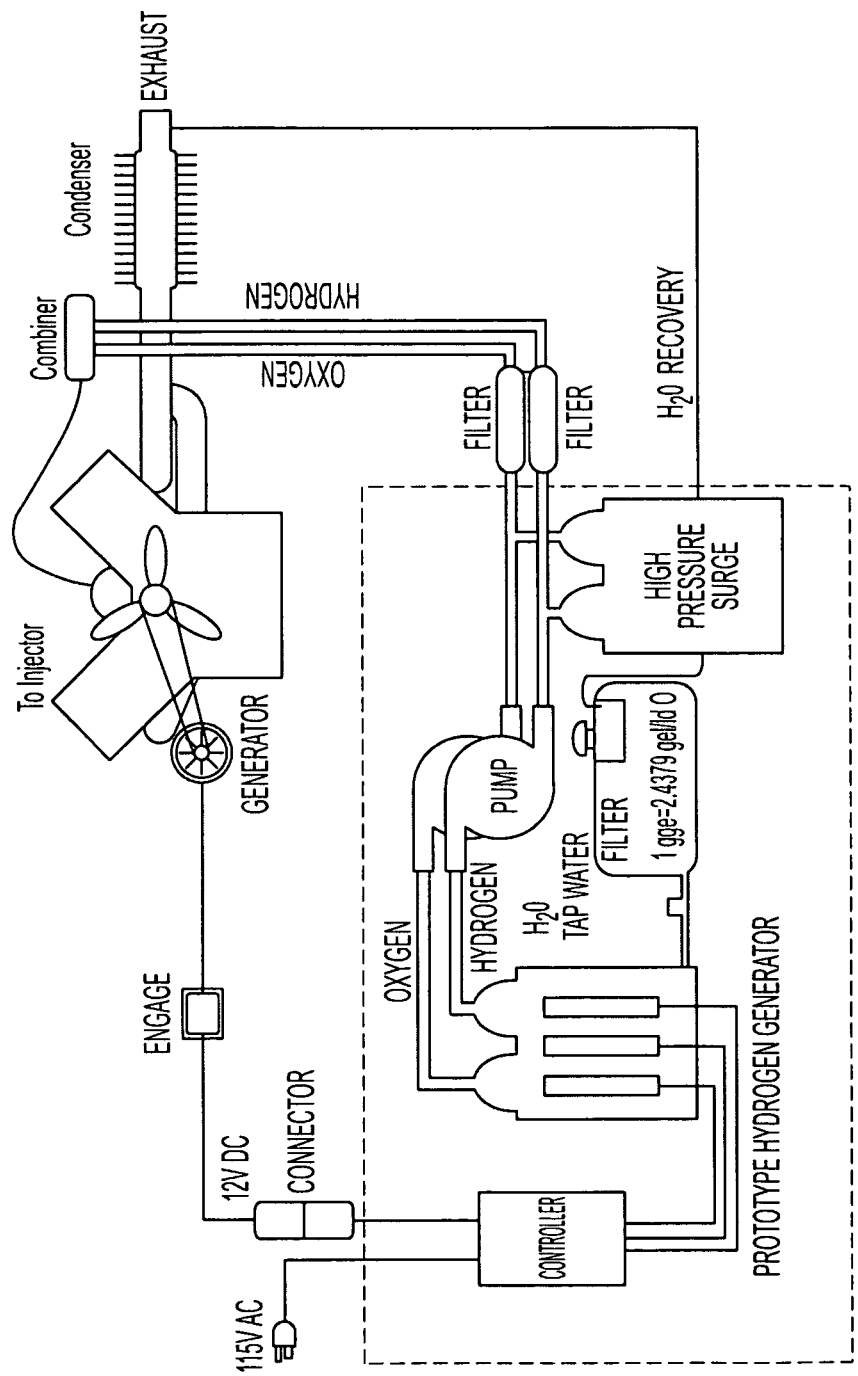
FIG. 10 is an exemplary embodiment of a transportation application.

There are potentially a wide range of applications for the present technology. For example, FIG. 9 illustrates a residential application and FIG. 10 illustrates an automotive application. Other applications may become apparent to one of skill in the art who has read this disclosure. From the foregoing disclosure, it will be appreciated by those skilled in the art that the techniques described herein may be applied to a wide variety of systems for the production of hydrogen and oxygen that utilizes a system of electrolysis and chemical reduction.

The following examples merely illustrate aspects of the technology and are not limiting of the invention which is defined by the claims here below.

EXAMPLES

Hydrogen Production with Aluminum Powder

A chemical bath was prepared with a solution that included the following solutes:
  50-ml colloidal silver
  50 ml colloidal magnesium
  50 ml distilled water
  20 grams sodium hydroxide
  20 grams potassium hydroxide
  7 grams of aluminum This solution 35 was placed in a 250 ml beaker 30. To this, 7 grams of aluminum were added and allowed to digest before the electrodes 10, 20 were inserted. The power supply was connected to the switching circuit, with the output voltage set at 2.0 volts DC (see FIG. 8, Table 1, Col. 1) at 0.25 amps (see Table 1, Col. 2). The positive wire 70 was connected to the nickel electrode 10 and negative lead 60 to the graphite electrodes 20. During the hydrogen/oxygen production, the aluminum hydroxide was reduced to aluminum on the graphite electrode and the aluminum reacted with the strong base electrolyte, thereby producing hydrogen on the graphite electrodes. Oxygen was produced on the nickel electrode as a result of the metal reduction. The gas flow was tested for the presence of hydrogen and oxygen by piping it through soapy water and then lighting the bubbles, which exploded very loudly, strongly indicating the presence of both hydrogen and oxygen.

It should also be appreciated that the illustrated exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

Hydrogen Production with Zinc

A chemical bath was prepared with a solution that included the following solutes:
  50-ml colloidal silver
  50 ml colloidal magnesium
  50 ml distilled water
  20 grams sodium hydroxide
  20 grams potassium hydroxide
  7 grams of zinc This solution is placed in a 250 ml beaker 30 to pre-treat a nickel electrode. To this, 7 grams of zinc are connected to a nickel electrode and allowed to digest, depositing zinc onto the nickel. The nickel electrode is then removed. The power supply is connected to the switching circuit, with the output voltage set at 2.0 volts DC, as in the above example. The positive wire is connected to the graphite electrode and negative lead to the pre-treated nickel electrode. During the hydrogen/oxygen production, the zinc hydroxide is reduced to zinc on the nickel electrode and the zinc reacts with the nickel in the strong base electrolyte, thereby producing hydrogen on the nickel electrodes. Oxygen is produced on the graphite electrode as a result of the metal reduction. The gas flow is tested for the presence of hydrogen and oxygen by piping it through soapy water and then lighting the bubbles, which explode very loudly, strongly indicating the presence of both hydrogen and oxygen.

The invention claimed is:

1. A method of producing hydrogen and oxygen from an aqueous electrolyte comprising:

placing a graphite electrode and a nickel electrode in an alkaline electrolyte comprising colloidal silver, colloidal magnesium and a metal powder;

applying a constant positive voltage to the nickel electrode; and charging the graphite electrode with a negative potential according to a predetermined cycle, the predetermined cycle comprising a first time period during which the graphite electrode is not charged, the first time period being sufficient to permit removal of substantially all metal from the metal powder electrolytically deposited on the graphite electrode, the depositing of the metal occurring during a second time period of the predetermined cycle when the graphite electrode is charged.

2. The method of claim 1, wherein during the step of charging includes a second time period during which the graphite electrode is negatively charged.

3. The method of claim 2, wherein the metal powder comprises aluminum powder and comprising depositing aluminum on the graphite electrode during the second time period.

4. The method of claim 1, further comprising collecting hydrogen gas at the graphite electrode.

5. The method of claim 1, further comprising collecting oxygen gas at the nickel electrode.

6. The method of claim 1, further comprising before the step of placing the graphite electrode, pre-treating the graphite electrode to impregnate the graphite electrode with a precious metal.

7. The method of claim 6, wherein the step of pre-treating comprises impregnating the graphite electrode with platinum or palladium.

8. The method of claim 6, wherein the step of pre-treating comprises at least partially immersing the graphite electrode in an electrolyte comprising a colloidal precious metal and impregnating the graphite electrode by electrolysis.

9. The method of claim 8, wherein the step of pre-treating further comprises reversing polarity of the graphite electrode multiple times during electrolysis.

10. The method of claim 1, wherein the step of placing comprises placing multiple graphite electrodes.

11. The method of claim 1, wherein the step of placing comprises placing multiple nickel electrodes.

* * * * *